Figure 1:
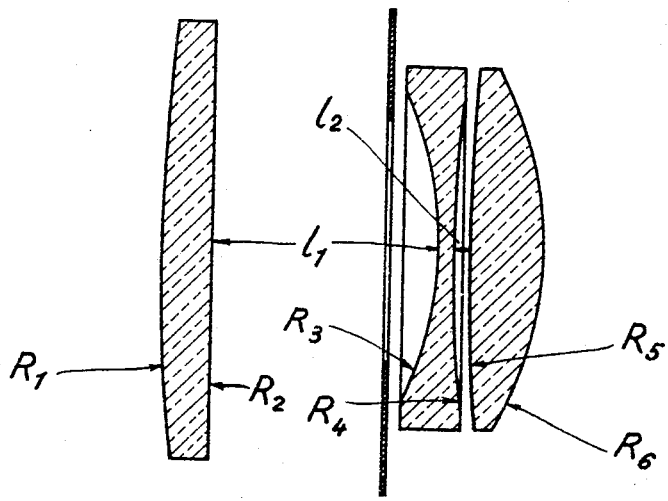

May 31, 1932.  F. W. GEHRKE  1,860,575

PHOTOGRAPHIC OBJECTIVE

Filed April 1, 1929    2 Sheets-Sheet 1

$R_1 = +68.0$
$R_2 = \infty$        $d_1 = 1.9$     $l_1 = 9.0$
$R_3 = -13.9$
$R_4 = +54.8$     $d_2 = 0.5$     $l_2 = 0.55$  Focus 100mm
$R_5 = +104.2$
$R_6 = -15.0$      $d_3 = 3.0$ $nD_1 = 1.6112$   $v = 55.8$
$nD_2 = 1.5481$   $v = 45.9$
$nD_3 = 1.6088$   $v = 58.9$ Friedrich Wilhelm Gehrke,
by Philip S. Hopkins, Attorney.

May 31, 1932.　　　F. W. GEHRKE　　　1,860,575
PHOTOGRAPHIC OBJECTIVE
Filed April 1, 1929　　　2 Sheets-Sheet 2

Inventor:
Friedrich W. Gehrke,
By Philip S. Hopkins,
Attorney.

Patented May 31, 1932

1,860,575

UNITED STATES PATENT OFFICE

FRIEDRICH WILHELM GEHRKE, OF MUNICH, GERMANY, ASSIGNOR TO AGFA ANSCO CORPORATION, OF BINGHAMTON, NEW YORK, A CORPORATION OF NEW YORK

PHOTOGRAPHIC OBJECTIVE

Application filed April 1, 1929, Serial No. 351,771, and in Germany April 4, 1928.

The present invention relates to a triplet objective for use in hand cameras with fixed extension, by which it is possible to effect the focusing for taking near objects by merely moving the member placed before the diaphragm, without thereby impairing the picture.

According to my invention it is possible to focus objects without changing the distance of the objective from the light sensitive layer, by using a triplet objective comprising a front member consisting of a positive lens, and a back member separated from the front member by a diaphragm and consisting of a negative lens adjacent to the diaphragm and a positive lens, in which objective the distance of the front member from the diaphragm can be modified, whereas the space between the diaphragm and the back member is unchangeable.

I further found it to be advantageous that the extensibility of the tubes comprising the front member of such a triplet objective does not exceed 5 per cent., that the focal length of the front member does not exceed 20 per cent. and that the space between the diaphragm and the front lens does not exceed 8 per cent. of the total focal length.

The objective according to my invention comprises a positive lens of short focal length placed in front of the diaphragm and a positive or negative member placed behind the diaphragm, the latter member consisting of a flint- and crown-glass lens in order that the chromatic, spheric, astigmatic and comatic oberrations may be compensated.

The mounting of the front member is provided with a steep thread or helicoid thread.

In an objective combination, consisting, for instance of two positive lenses of focal lengths $f_1$ and $f_2$, spaced apart by a distance $e$, this distance of the lenses is increased, it is seen from the formula:

$$F = \frac{f_1 \cdot f_2}{e - f_1 - f_2}$$

that, when this distance increases, the effect of the front lens is greater in relation to the total focal length.

If the distance becomes so great, that $f_2$ is at the focus $f_1$, $f_2$ has no effect and the total focal length is equal to $f_1$.

The displacement of an objective when focused for taking near objects may be derived in known manner from the formula:

$$\frac{1}{F} = \frac{1}{a} + \frac{1}{b}$$

It is evident therefrom that the displacement of the objective, that is the camera extension-length $b$ depends on the focal length $F$.

In order to limit the extension of the tube, even if near objects are to be focused, it is advisable that the displacement should not exceed 5 per cent. of the total focal length.

Also, as it is desirable to focus objects as near as 2 meters, it is absolutely necessary to use a front member of a short focal length; therefore it is advisable that the focal length of the front member should not exceed that of the whole objective by more than 20 per cent. It is also useful, in order to provide sufficient space for the tube within the casing that the distance between the diaphragm and the front lens should be at least 8 per cent. of the total focal length.

The accompanying diagram illustrates in Fig. 1 by way of example a construction of lenses for carrying out the invention. The corresponding data are indicated in the table seen on the diagram.

Figure 2:
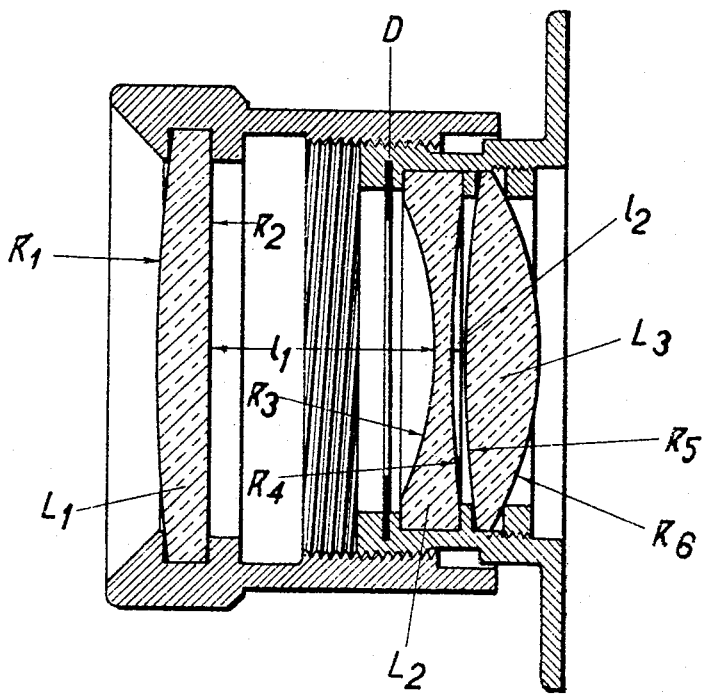

Fig. 2 shows a mounting of my new lens system comprising the lenses $L_1$, $L_2$ and $L_3$ and the diaphragm D. The part of the mounting bearing the front lens $L_1$ is provided with a helicoid thread and thus is adjustable within certain limits. This specific feature of adjusting lens elements is well known in the art and not claimed in the present application.

I claim:

1. A triplet objective comprising a front member consisting of a positive lens, a rear member and a diaphragm separating the front member from the rear member, said rear member consisting of a negative lens adjacent to the diaphragm and of a positive lens, the positive front lens being separated from the negative lens of the rear member by a relatively long air space, the length of which is variable to focus the triplet for exposures at different distances.

2. A triplet objective comprising an extensible lens tubes of an extensibility less than 5 per cent. of the total focal length of the lens system, a front member consisting of a positive lens of a focal length not exceeding 20 per cent. of the equivalent focal length of the combination, a rear member, a diaphragm separating the front member from the rear member, said rear member consisting of a negative lens adjacent to the diaphragm and of a positive lens, the positive front lens being separated from the negative lens of the rear member by a relatively long air space, the length of which is variable to focus the triplet for exposures at different distances, the distance between the diaphragm and the front lens being at least 8 per cent. of the total focal length.

In testimony whereof I affix my signature.

FRIEDRICH WILHELM GEHRKE.